(12) United States Patent
Sugawara et al.

(10) Patent No.: US 7,364,813 B2
(45) Date of Patent: Apr. 29, 2008

(54) INK FOR FORMING CATALYST LAYER, AND ELECTRODE AND MEMBRANE-ELECTRODE ASSEMBLY USING THE SAME

(75) Inventors: Yasushi Sugawara, Higashiosaka (JP); Junji Morita, Moriguchi (JP); Takeshi Yonamine, Mino (JP); Yasuo Takebe, Uji (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 666 days.

(21) Appl. No.: 10/936,731

(22) Filed: Sep. 9, 2004

(65) Prior Publication Data

US 2005/0064276 A1    Mar. 24, 2005

(30) Foreign Application Priority Data

Sep. 12, 2003    (JP) .............................. 2003-321527

(51) Int. Cl.
*H01M 4/86* (2006.01)
*H01M 4/96* (2006.01)
*H01M 8/10* (2006.01)
*B01J 21/18* (2006.01)

(52) U.S. Cl. .............................. 429/42; 429/30; 429/44; 502/159; 502/180

(58) Field of Classification Search .................. 429/30, 429/38, 39, 42, 44; 502/159, 180
See application file for complete search history.

(56) References Cited

U.S. PATENT DOCUMENTS

| | | | | |
|---|---|---|---|---|
| 6,060,187 | A | * | 5/2000 | Uchida et al. ................. 429/30 |
| 6,099,984 | A | * | 8/2000 | Rock ............................ 429/39 |
| 6,462,095 | B1 | | 10/2002 | Bonsel et al. |

FOREIGN PATENT DOCUMENTS

| | | |
|---|---|---|
| EP | 0 874 413 A2 | 10/1998 |
| JP | 8-264190 | 10/1996 |
| JP | 11-288727 | 10/1999 |
| JP | 2000-188110 | 7/2000 |
| JP | 2001-521270 A | 11/2001 |
| JP | 2001-345110 | 12/2001 |

* cited by examiner

*Primary Examiner*—Stephen J. Kalafut
(74) *Attorney, Agent, or Firm*—McDermott Will & Emery LLP (57) ABSTRACT

The present invention provides ink for forming a catalyst layer containing at least a cation conductive polymer electrolyte, catalyst-supporting particles including conductive carbon particles and an electrode catalyst supported thereon, and a dispersion medium, wherein the polymer electrolyte has a mean inertia radius of 150 to 300 nm. A catalyst layer made of the catalyst layer ink improves in gas diffusion property and increases cell voltage, which allows providing a proton conductive polymer electrolyte fuel cell capable of maintaining the high cell voltage for a long time.

9 Claims, 9 Drawing Sheets

INK FOR FORMING CATALYST LAYER, AND ELECTRODE AND MEMBRANE-ELECTRODE ASSEMBLY USING THE SAME

BACKGROUND OF THE INVENTION

The present invention relates to ink for forming a catalyst layer suitable for manufacturing a polymer electrolyte fuel cell. Further, the present invention relates to a gas diffusion electrode and a membrane-electrode assembly obtained using the ink, as well as a polymer electrolyte fuel cell comprising the gas diffusion electrode and the membrane-electrode assembly.

Figure 8:
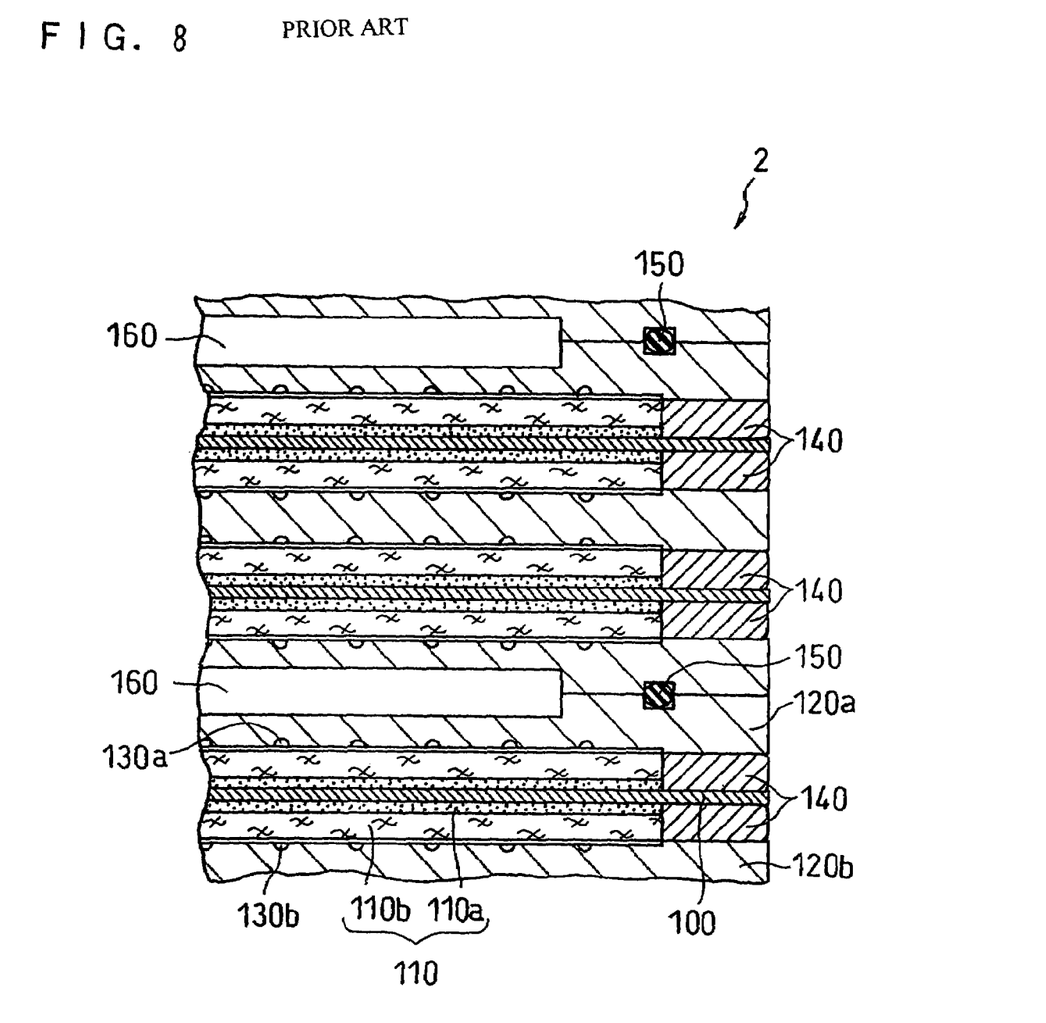
FIG. 8 is a schematic section illustrating a basic structure of a conventional polymer electrolyte fuel cell.

A polymer electrolyte fuel cell is a device that causes an electrochemical reaction between a fuel gas and an oxidant gas, for example, between hydrogen and air, to generate electric power and heat simultaneously. FIG. 8 schematically illustrates a basic structure of such a polymer electrolyte fuel cell.

In a fuel cell 2 shown in FIG. 8, catalyst layers 110a are formed on both surfaces of a cation (proton) conductive polymer electrolyte membrane 100 capable of selectively transporting cations (protons), respectively. Each of the catalyst layers 110a is closely adhered to the polymer electrolyte membrane 100 by hot press or the like and comprises conductive carbon particles supporting thereon a particulate electrode catalyst comprising noble metal such as platinum. Further, gas diffusion layers 110b having both gas permeability and electrical conductivity are arranged in close contact with the surfaces of the catalyst layers 110a by hot press or the like, respectively. The catalyst layer 110a and the gas diffusion layer 110b contacting each other function as a gas diffusion electrode 110.

Over the surfaces of the gas diffusion layers 110b, conductive separator plates 120a and 120b are disposed, respectively. The conductive separator plates 120a and 120b mechanically secure a membrane-electrode assembly (MEA) comprising the proton conductive polymer electrolyte membrane 100 and the gas diffusion electrodes 110 arranged on both surfaces thereof and electrically connects adjacent MEAs in series. The conductive separator plates 120a and 120b have gas flow channels 130a and 130b, respectively, for supplying a reaction gas to the gas diffusion electrodes or carrying a gas generated by the reaction or a surplus gas away from the electrodes, a gasket 140, a sealing member 150 and a cooling water flow channel 160 formed between the conductive separator plates 120a and 120b.

In general, the catalyst layer 110a is obtained by forming a thin film of a mixture of conductive carbon particles supporting thereon an electrode catalyst comprising noble metal such as platinum, a proton conductive polymer electrolyte and a dispersion medium. Perfluorocarbonsulfonic acid is generally used as the proton conductive polymer electrolyte.

More specifically, the catalyst layer 110a is formed in the following manner. First, a dispersion of the proton conductive polymer electrolyte in an alcohol dispersion medium such as ethanol is mixed with the conductive carbon particles supporting the electrode catalyst thereon and optionally a water repellant or conductive carbon powder covered with a water repellant. Then, the mixture is added with an organic solvent having relatively high boiling point such as isopropyl alcohol or butyl alcohol to prepare ink for forming a catalyst layer (hereinafter may be referred to as a catalyst layer ink).

Then, the catalyst layer ink is applied to the polymer electrolyte membrane 100 or the gas diffusion layer 110b by screen printing, spraying or using a doctor blade to form a catalyst layer 110a.

Alternatively, the catalyst layer 110a may be formed by coating a base sheet comprising a polymer material such as polypropylene with the catalyst layer ink, and then drying the coating. In this case, the base sheet provided with the catalyst layer 110a may be hot-pressed to the polymer electrolyte membrane 100 to transfer the catalyst layer 110a thereto.

The MEA may be formed by hot-pressing a stack of the polymer electrolyte membrane 100, the catalyst layers 110a and the gas diffusion electrodes 110b by hot press.

Regarding the catalyst layer 110a, one of the most important factors determining discharge performance of a cell is the size of reaction area at a three-phase interface among a gap serving as a reaction gas supply channel, the proton conductive polymer electrolyte and the electrode catalyst serving as an electronic conductor. With the area of the three-phase interface being large and stable for a long time, the cell shows high durability.

In particular, for the purpose of increasing contact area with the electrode catalyst to increase a reaction site, it is of importance to ensure proton conduction pass (proton network) of the proton conductive polymer electrolyte.

For example, aiming at covering platinum supported in pores of the conductive carbon particles with the proton conductive polymer electrolyte (an ion exchange resin containing fluorocarbonsulfonic acid), Japanese Laid-Open Patent Publication No. 2000-188110 proposes a technique of reducing the molecular weight of the fluorocarbonsulfonic acid-containing ion exchange resin contained in the catalyst layer ink. More specifically, extrusion of a fused precursor of the ion exchange resin is carried out at a controlled temperature of 80 to 170° C. to shorten the main chain of polytetrafluoroethylene (PTFE) in the polymer electrolyte.

Further, Japanese Laid-Open Patent Publication No. HEI8-264190 proposes a technique for controlling the state of the catalyst layer ink by using a dispersion medium. For example, a polymer electrolyte in a colloidal form is adsorbed on platinum-supporting conductive carbon particles.

Even in accordance with the prior art including the above-described patent publications, it may be possible to cover platinum in the pores of the conductive carbon particles with the proton conductive polymer electrolyte. However, according to the prior art, the polymer electrolyte may remain in the gap in the catalyst layer through which gas should be supplied (gas supply channel) or the polymer electrolyte may distribute unevenly in the thickness direction of the catalyst layer made of the catalyst layer ink. An electrode comprising such a catalyst layer increases a static electrochemical reaction area, which can be measured by cyclic voltammetry, but improves less in voltage in a current range applied for actual power generation (gas diffusion rate-determining range). This may reduce the gas diffusion property of the electrode including the catalyst layer, causing easy occurrence of flooding.

In particular, regarding a fuel cell comprising the electrode including a catalyst layer in the above-described state, flooding may occur with time to reduce the voltage, even if the three-phase interface is favorably formed at the initial operation stage.

Figure 9:
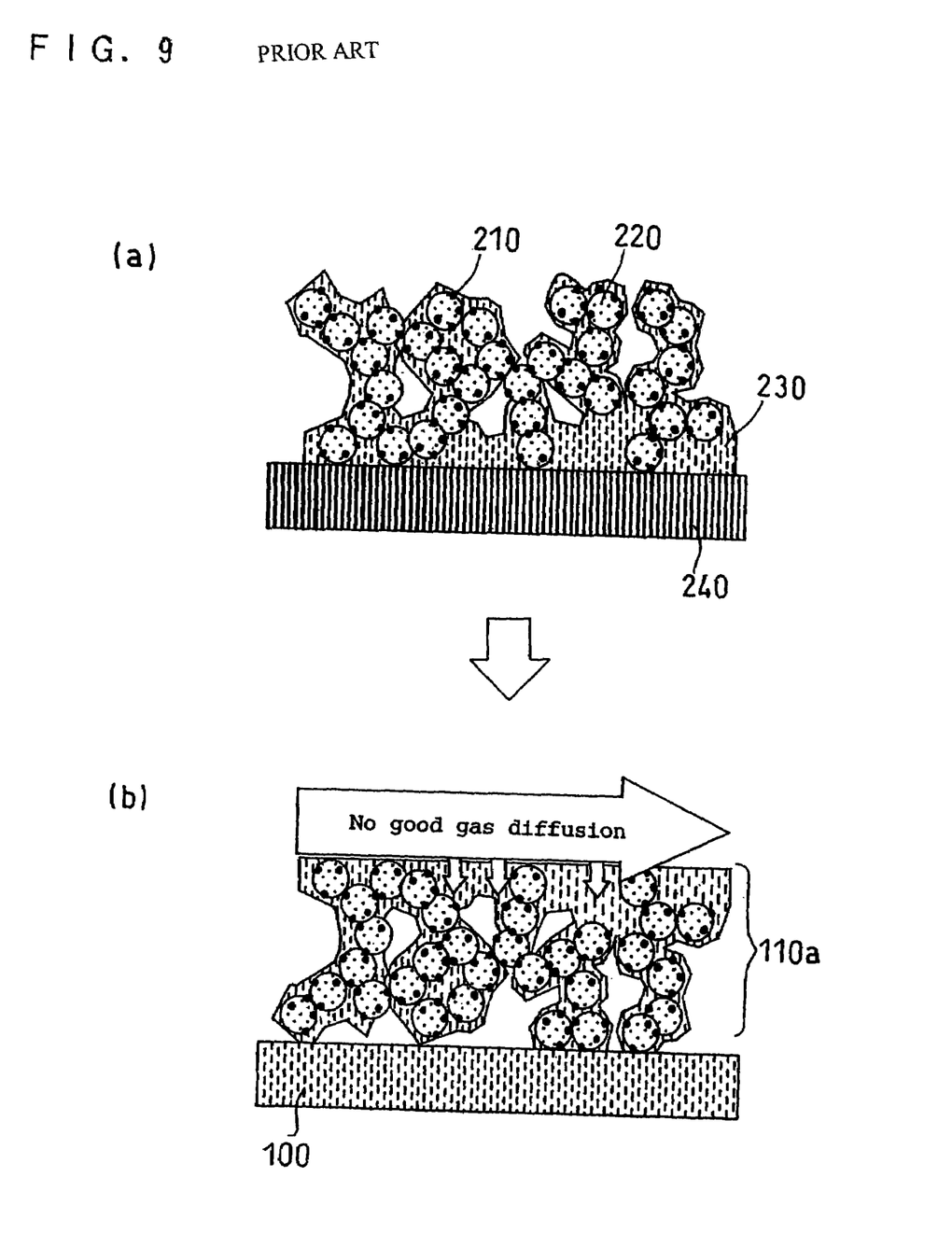
FIG. 9 is a section schematically illustrating a conventional catalyst layer.

Then, referring to the drawings, detailed explanation is given of the uneven distribution of the polymer electrolyte in the catalyst layer. FIGS. 9(a) and 9(b) are sections schematically illustrating a conventional catalyst layer.

As shown in FIGS. 9(a) and 9(b), a conventional catalyst layer ink comprises conductive carbon particles 220 supporting an electrode catalyst 210 comprising noble metal thereon and a proton conductive polymer electrolyte 230 having a short molecular chain.

For example, to form the catalyst layer by transfer method, the catalyst layer ink is applied to a base sheet 240 made of a resin. Then, the proton conductive polymer electrolyte 230 in the ink moves toward the base sheet 240 before the ink is dried. Accordingly, when the obtained catalyst layer 110a is transferred to the polymer electrolyte membrane 100, the polymer electrolyte 230 in the transferred catalyst layer 110a is distributed to one side, i.e., toward the gas diffusion layer (opposite to the polymer electrolyte membrane 100). Therefore, the thus obtained electrode deteriorates in gas diffusion property and resistance to flooding.

Even in the case where the catalyst layer 110a is formed directly on the polymer electrolyte membrane 100, a larger amount of the proton conductive polymer electrolyte 230 is present in the vicinity of the polymer electrolyte membrane 100, thereby the resulting catalyst layer becomes less contributory to the electrochemical reaction. Accordingly, voltage reduction by CO poisoning becomes significant in an anode, while voltage reduction in a high current density becomes remarkable in a cathode. Further, such a fuel cell causes voltage reduction due to flooding that occurs when the fuel cell is operated by high humidity reactant gases.

BRIEF SUMMARY OF THE INVENTION

The present invention has been achieved in view of the above problems. An object of the present invention is to provide ink for forming a catalyst layer, which allows manufacture of a polymer electrolyte fuel cell comprising a catalyst layer having sufficient gas diffusion property and capable of preventing flooding and maintaining high cell voltage for a long time with ease and reliability. Another object of the present invention is to obtain a gas diffusion electrode and a membrane-electrode assembly which allow easy and reliable manufacture of a polymer electrolyte fuel cell capable of preventing flooding and maintaining high cell voltage for a long time. Still another object of the present invention is to obtain a polymer electrolyte fuel cell capable of preventing flooding and maintaining high cell voltage for a long time.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

As a result of intensive study to achieve the above-mentioned objects, the inventors of the present invention have found that the state of the polymer electrolyte in the catalyst layer ink is one of the factors having a great influence on whether the polymer electrolyte in a catalyst layer made of the ink is effectively distributed to establish a favorable three-phase interface.

Further, the inventors of the present invention have found that an effective index for the state of the polymer electrolyte in the catalyst layer ink is a mean inertia radius of the polymer electrolyte in the catalyst layer ink (hereinafter may be referred to as "mean inertia radius 1" as needed), or a mean inertia radius of the polymer electrolyte dispersed in a dispersion medium which may be used in the catalyst layer ink (hereinafter may be referred to as "mean radium of inertia 2" as needed).

Then, the inventors of the present invention have found that the polymer electrolyte is favorably in a distributed state in the resulting catalyst layer if the catalyst layer ink contains a polymer electrolyte having the mean inertia radius 1 or 2 in a particular range, rather than a polymer electrolyte having a molecular weight in a particular range. That is, the maldistribution of the polymer electrolyte is suppressed to a sufficient degree. In particular, they also have found that use of such a polymer electrolyte is effective in giving the resulting catalyst layer excellent gas diffusion property and resistance to flooding with ease and reliability.

Further, the inventors of the present invention have also found that it is particularly effective for achievement of the objects to prepare a catalyst layer ink containing a polymer electrolyte having a relatively larger mean inertia radius (mean inertia radius 1 or 2) than that of a polymer electrolyte contained in a conventional catalyst layer ink and to form a catalyst layer using the thus prepared catalyst layer ink. Thus, the present invention has been achieved.

That is, to achieve the above objects, the present invention provides ink for forming a catalyst layer comprising at least: a cation conductive polymer electrolyte; catalyst-supporting particles comprising conductive carbon particles and an electrode catalyst supported thereon; and a dispersion medium, wherein the polymer electrolyte has a mean inertia radius of 150 to 300 nm.

As described above, with use of the catalyst layer ink containing a polymer electrolyte having a mean inertia radius of 150 to 300 nm, a catalyst layer, in which the maldistribution of the polymer electrolyte is suppressed to show excellent gas diffusion property, is obtained with ease and reliability. Accordingly, a conductive network of the polymer electrolyte is ensured to a sufficient degree and a favorable three-phase interface among the electrode catalyst, reaction gas and the polymer electrolyte is established.

Further, use of the catalyst layer allows obtaining a gas diffusion electrode, a membrane-electrode assembly and a polymer electrolyte fuel cell capable of maintaining high cell voltage for a long time.

In this context, "inertia radius" of the cation (proton) conductive polymer electrolyte indicates an extent (radius of gyration) of a polymer chain from the center of gravity in the polymer electrolyte contained in the catalyst layer ink or the dispersion medium. "Mean inertia radius" is an arithmetic mean value thereof. The inertia radius may vary depending on the kind of dispersion medium. In the present invention, however, the catalyst layer ink is prepared by adding conductive carbon particles supporting thereon an electrode catalyst comprising noble metal to the proton conductive polymer electrolyte dispersion. That is, no other dispersion medium is added. Therefore, it is presumed that the mean inertia radius 2 in the dispersion and the mean inertia radius 1 in the catalyst layer ink are substantially the same.

If the mean inertia radius (1 or 2) is less than 150 nm, distribution of the polymer electrolyte becomes uneven in the catalyst layer made of the catalyst layer ink. Therefore, the gas diffusion property of the catalyst layer decreases, resulting in low cell voltage. On the other hand, if the mean inertia radius (1 or 2) exceeds 300 nm, the polymer electrolyte cannot go into the pores of the electrode catalyst-supporting conductive carbon particles mixed into the polymer electrolyte dispersion, thereby the electrode catalyst in the pores cannot be covered with the polymer electrolyte. Accordingly, the reaction area at the three-phase interface decreases, resulting in low cell voltage.

The inertia radius can be obtained by a known method in the art. In the present invention, a polymer electrolyte dispersion having a polymer electrolyte concentration of 0.1 to 1 wt % is prepared as a sample. Then, angle dependence of intensity of scattered light from molecules of the polymer electrolyte in the dispersion is measured by static light scattering measurement to obtain the inertia radius.

In the present invention, "polymer electrolyte dispersion" signifies liquid in which a polymer electrolyte is dispersed, or liquid in which part of the polymer electrolyte is dissolved while the other part is not dissolved but dispersed.

In the present invention, "dispersion medium" may be liquid capable of dispersing the polymer electrolyte, liquid capable of dissolving the polymer electrolyte, or liquid capable of dissolving part of the polymer electrolyte and dispersing the other part thereof.

The present invention further provides a gas diffusion electrode comprising a catalyst layer made of the above-described catalyst layer ink of the present invention comprising at least: a cation conductive polymer electrolyte, catalyst-supporting particles comprising conductive carbon particles and an electrode catalyst supported thereon; and a dispersion medium.

The gas diffusion electrode of the present invention includes the catalyst layer made of the catalyst layer ink of the present invention. Therefore, it allows manufacture of a membrane-electrode assembly and a polymer electrolyte fuel cell capable of maintaining high cell voltage for a long time.

In the present invention, "gas diffusion electrode" may comprise (I) a catalyst layer only or (II) a combination of a gas diffusion layer and a catalyst layer formed thereon.

The present invention further provides a membrane-electrode assembly comprising a first electrode having a first catalyst layer, a second electrode having a second catalyst layer and a polymer electrolyte membrane arranged between the first electrode and the second electrode, wherein at least one of the first catalyst layer and the second catalyst layer is made of the above-described catalyst layer ink of the present invention comprising at least: a cation conductive polymer electrolyte; catalyst-supporting particles comprising conductive carbon particles and an electrode catalyst supported thereon; and a dispersion medium.

The membrane-electrode assembly of the present invention includes the catalyst layer and the gas diffusion electrode formed by using the catalyst layer ink of the present invention. Therefore, it allows manufacture of a polymer electrolyte fuel cell capable of maintaining high cell voltage for a long time.

One of the first and second electrodes is an anode and the other is a cathode.

The present invention further provides a polymer electrolyte fuel cell comprising the above-described membrane-electrode assembly and a pair of conductive separator plates each having a gas flow channel for supplying reaction gas to the membrane-electrode assembly.

The polymer electrolyte fuel cell of the present invention includes the above-described membrane-electrode assembly of the present invention. Therefore, high cell voltage is maintained for a long time.

According to the catalyst layer ink of the present invention, a catalyst layer in which the maldistribution of the polymer electrolyte is suppressed to show excellent gas diffusion property is obtained. Further, the condition of the three-phase interface among the electrode catalyst, reaction gas and the polymer electrolyte is made favorable and a conductive network of the polymer electrolyte is ensured to a sufficient degree. Moreover, with use of the resulting catalyst layer, a gas diffusion electrode, a membrane-electrode assembly and a polymer electrolyte fuel cell capable of maintaining high cell voltage for a long time are obtained.

Since the gas diffusion electrode of the present invention includes the catalyst layer made of the catalyst layer ink, a membrane-electrode assembly and a polymer electrolyte fuel cell, in which the maldistribution of the polymer electrolyte is suppressed, thereby exhibiting excellent gas diffusion property and maintaining high cell voltage for a long time, are obtained.

Further, since the membrane-electrode assembly of the present invention includes the above-described gas diffusion electrode, high cell voltage is maintained for a long time.

Further, since the polymer electrolyte fuel cell of the present invention includes the membrane-electrode assembly described above, high cell voltage is maintained for a long time.

Hereinafter, preferable embodiments of the present invention will be described with reference to the drawings. In the following explanation, the same or similar components are given with the same reference numeral and description overlapping with the other may be omitted.

Figure 1:
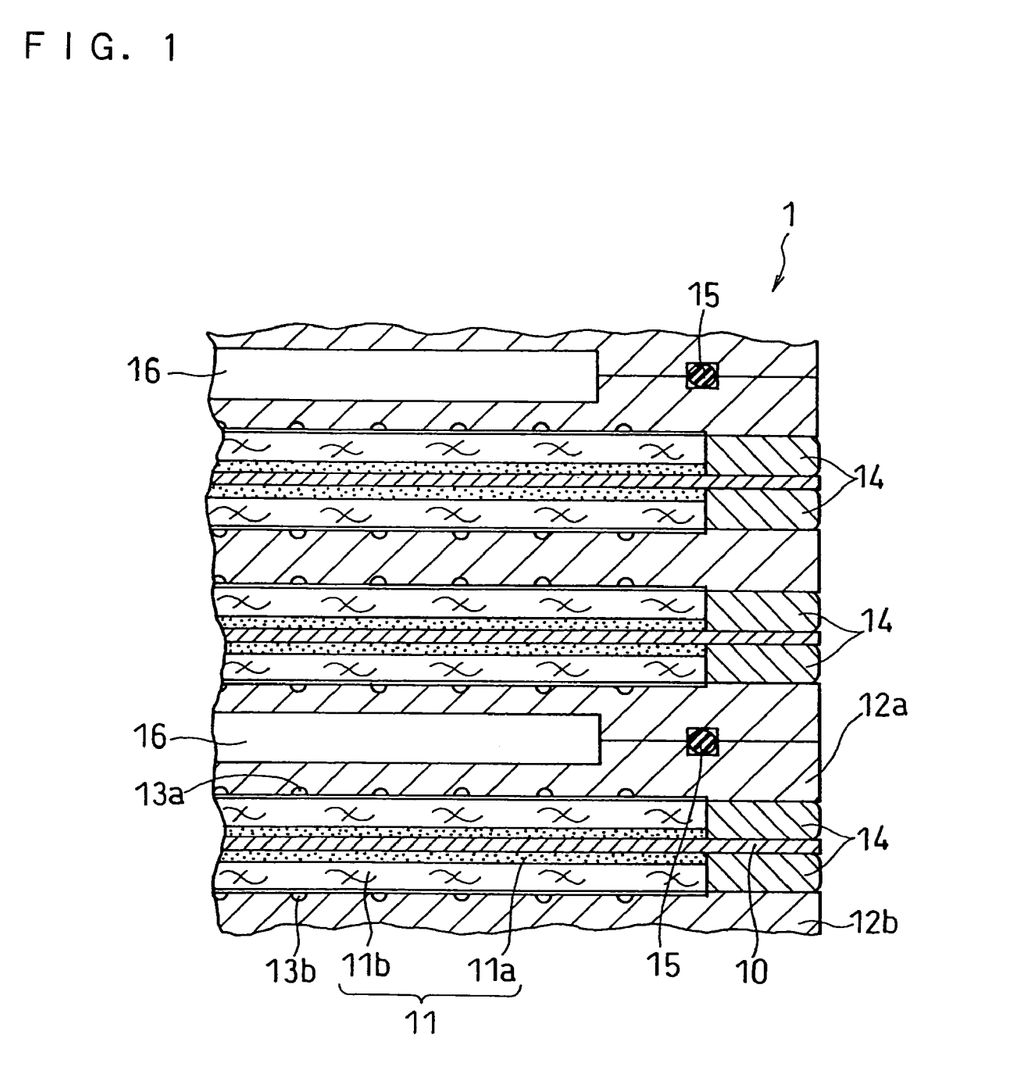
FIG. 1 is a schematic section illustrating a basic structure of a preferred polymer electrolyte fuel cell according to the present invention.

FIG. 1 is a schematic section illustrating a basic structure of a preferred polymer electrolyte fuel cell according to the present invention. Referring to FIG. 1, a polymer electrolyte fuel cell 1 includes a gas diffusion electrode formed by using a catalyst layer ink of the present invention and a membrane-electrode assembly including the gas diffusion electrode.

The polymer electrolyte fuel cell 1 shown in FIG. 1 comprises a proton conductive polymer electrolyte membrane 10, a gas diffusion electrode 11 including a catalyst layer 11a and a gas diffusion layer 11b, conductive separator plates 12a and 12b having gas flow channels 13a and 13b, respectively, a gasket 14, a sealing member 15 and a cooling water flow channel 16 formed between the conductive separator plates 12a and 12b.

On both surfaces of the proton conductive polymer electrolyte membrane 10, the catalyst layers 11a, each of which is mainly composed of conductive carbon particles supporting thereon a particulate electrode catalyst comprising noble metal such as platinum, are arranged in close contact with the polymer electrolyte membrane, respectively, by a known technique such as hot press. Further, gas diffusion layers 11b having both gas permeability and electrical conductivity are arranged in close contact with the surfaces of the catalyst layers 11a, respectively, by a known technique such as hot press. The catalyst layer 11a and the gas diffusion layer 11b contacting each other functions as a gas diffusion electrode (anode or cathode) 11. Further, the polymer electrolyte membrane 10 and a pair of gas diffusion electrodes 11 serve as a membrane-electrode assembly (MEA).

Over the surfaces of the gas diffusion electrodes 11, conductive separator plates 12a and 12b are disposed, respectively. The conductive separator plates 12a and 12b mechanically secure the membrane-electrode assembly (MEA) and electrically connect adjacent MEAs in series. The conductive separator plates 12a and 12b include gas flow channels 13a and 13b, respectively, for supplying a reaction gas to the gas diffusion electrode or carrying gas generated by the reaction and surplus gas away from the electrode.

Further, a sealing member 15 for preventing water leakage is arranged between a pair of separator plates 12a and 12b having a cooling water flow channel 16.

The polymer electrolyte membrane 10 has the function of selectively transferring protons generated in the catalyst layer on the anode side to the catalyst layer on the cathode side along the thickness direction thereof. Further, the polymer electrolyte membrane 10 also serves as a separator for preventing mixing of hydrogen and oxygen supplied to the anode and the cathode, respectively.

Various materials may be used for the separator plates 12a and 12b, for example, metal, carbon, or a mixture of graphite and a resin.

The gas diffusion layer may be made of any material known in the art without any particular limitation. For example, carbon cloth or carbon paper may be used.

Then, explanation is given of a preferred embodiment of the catalyst layer ink of the present invention used to form the above-described catalyst layer 11a.

The catalyst layer ink includes conductive carbon particles supporting thereon an electrode catalyst comprising noble metal, cation (proton) conductive polymer electrolyte and a dispersion medium. The polymer electrolyte has a mean inertia radius (1 or 2) of 150 to 300 nm.

Examples of the polymer electrolyte include those having a cation exchange group, such as a sulfonic acid group, a carboxylic acid group, a phosphoric acid group or a sulfonimide group. In view of proton conductivity, a polymer electrolyte having a sulfonic acid group is particularly preferable.

The polymer electrolyte having a sulfonic acid group preferably has ion exchange capacity of 0.5 to 1.5 milliequivalent/g of dry resin. If the ion exchange capacity is less than 0.5 milliequivalent 1 g of dry resin, the resulting catalyst layer may possibly increase resistance during power generation. Further, if the ion exchange capacity is more than 1.5 milliequivalent/g of dry resin, the resulting catalyst layer increases in water content and is apt to cause swelling, which may possibly block the pores of the conductive carbon particles. Particularly preferable ion exchange capacity is 0.8 to 1.2 milliequivalent/g of dry resin.

The polymer electrolyte is preferably a copolymer comprising a unit of a perfluorovinyl compound represented by the formula: $CF_2=CF-(OCF_2CFX)_m-O_p-(CF_2)_n-SO_3H$ [wherein m represents an integer of 0 to 3, n represents an integer of 1 to 12, p represents 0 or 1 and X represents a fluorine atom or a trifluoromethyl group] and a tetrafluoroethylene unit.

Preferred examples of the above perfluorovinyl compound include compounds represented by the following formulae (3) to (5), wherein q represents an integer of 1 to 8, r represents an integer of 1 to 8 and t represents an integer of 1 to 3.

$$CF_2=CFO(CF_2)_q-SO_3H \quad (3)$$

$$CF_2=CFOCF_2CF(CF_3)O(CF_2)_r-SO_3H \quad (4)$$

$$CF_2=CF(OCF_2CF(CF_3))_tO(CF_2)_2-SO_3H \quad (5)$$

Specific examples of the polymer electrolyte include NAFION (trade name) manufactured by Aldrich and FLEMION (trade name) manufactured by Asahi Glass Corp. The above-mentioned polymer electrolytes may be used as a material for the polymer electrolyte membrane.

As described above, the mean inertia radius of the polymer electrolyte contained in the catalyst layer ink is 150 to 300 nm. With the mean inertia radius within the range, the maldistribution of the polymer electrolyte in the catalyst layer 11a is suppressed, thereby excellent gas diffusion property is given to the catalyst layer. Further, a favorable three-phase interface is obtained among the electrode catalyst, reaction gas and the polymer electrolyte and a conductive network of the polymer electrolyte is ensured to a sufficient degree.

With use of the catalyst layer 11a, the gas diffusion electrode 11, a membrane-electrode assembly (MEA) and the polymer electrolyte fuel cell 1 capable of maintaining high cell voltage are obtained.

If the mean inertia radius is less than 150 nm, the polymer electrolyte distribution becomes uneven in the catalyst layer made of the catalyst layer ink, thereby the gas diffusion property of the catalyst layer decreases, resulting in low cell voltage.

If the mean inertia radius exceeds 300 nm, the polymer electrolyte cannot get into the pores of the electrode catalyst-supporting conductive carbon particles when mixed into the polymer electrolyte dispersion, thereby the electrode catalyst in the pores cannot be covered with the polymer electrolyte. Accordingly, the reaction area at the three-phase interface decreases, resulting in low cell voltage.

The polymer electrolyte that meets the requirement of the above-described mean inertia radius (1 or 2) preferably has an average molecular weight of 200,000 to 300,000. If the average molecular weight is in this range, the polymer electrolyte has a larger inertia radius than that of a polymer electrolyte used for a catalyst layer of a conventional fuel cell.

Figure 2:
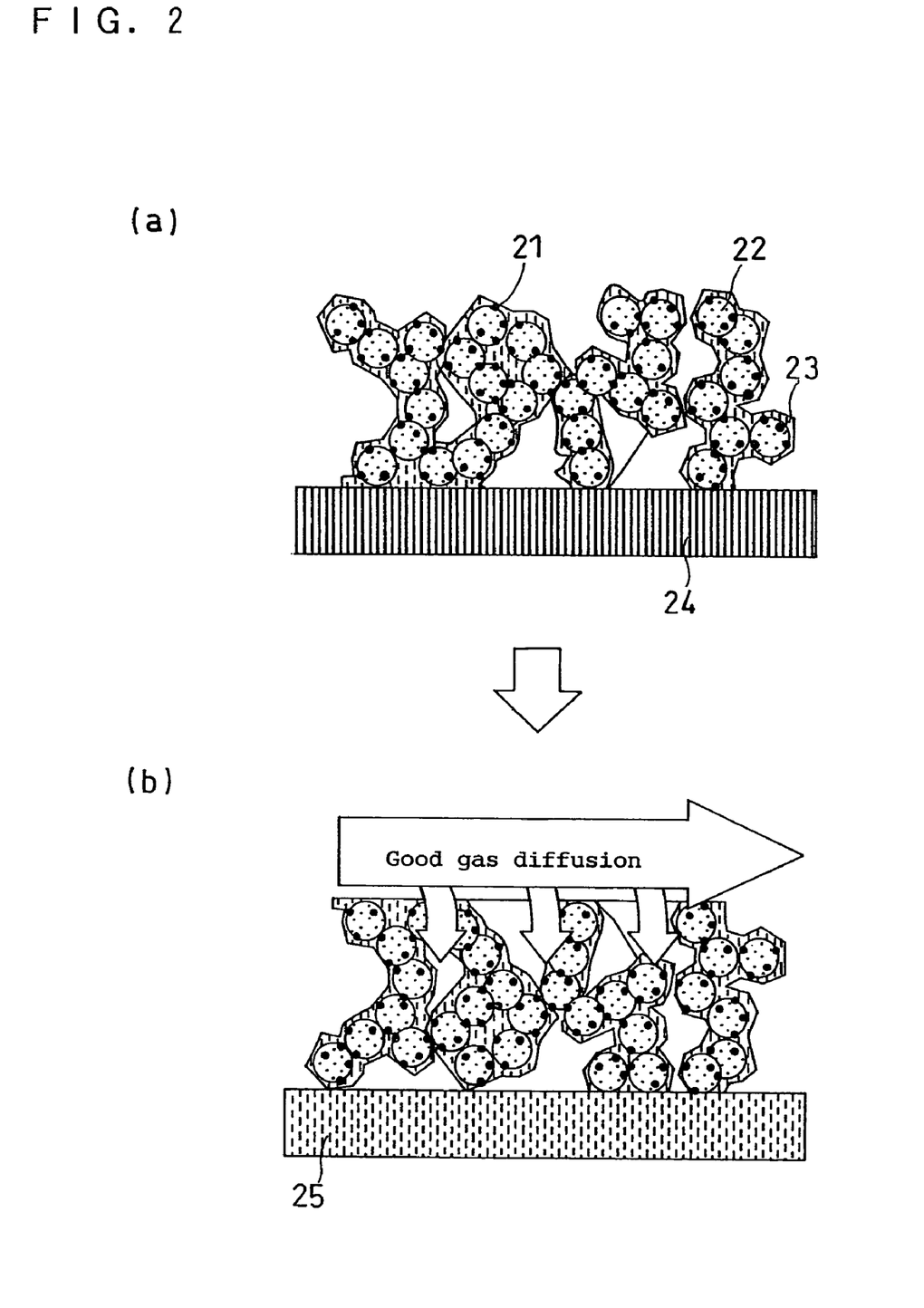
FIG. 2 is a section schematically illustrating a catalyst layer made of a catalyst layer ink of the present invention.

Therefore, in a process of applying and drying the catalyst layer ink to form the catalyst layer, the maldistribution of the polymer electrolyte 23 does not occur as shown in FIGS.

2(a) and 2(b). FIGS. 2(a) and 2(b) are sections schematically illustrating the catalyst layer made of the catalyst layer ink of the present invention.

The electrode catalyst 21 used in the present invention is supported on the conductive carbon particles (powder) and comprises metal particles. Various kinds of metal may be used for the metal particles without any particular limitation. For example, the material is preferably one or more selected from the group consisting of platinum, gold, silver, ruthenium, rhodium, palladium, osmium, iridium, chromium, iron, titanium, manganese, cobalt, nickel, molybdenum, tungsten, aluminum, silicon, zinc and tin. Among them, an alloy based on noble metal or platinum is preferable. An alloy of platinum and ruthenium is more preferable since the catalyst activity is stabilized.

The conductive carbon particles preferably have a specific surface area of 50 to 1500 m²/g. If the specific surface area is less than 50 m²/g, increasing the amount of the electrode catalyst supported thereon becomes difficult and the resulting catalyst layer may possibly deteriorate in output characteristic. Further, if the specific surface area is more than 1500 m²/g, the pores become too fine to be covered with the polymer electrolyte and the resulting catalyst layer may possibly deteriorate in output characteristic. A particularly preferable specific surface area is 200 to 900 m²/g.

Preferably, the mean particle diameter of the electrode catalyst particles is 1 to 5 nm, for it is difficult to produce electrode catalyst particles having a mean particle diameter less than 1 nm on an industrial scale. Further, if the mean particle diameter is more than 5 nm, activity per weight of the electrode catalyst decreases, resulting in cost increase of the fuel cell.

The conductive carbon particles preferably have a mean particle diameter of 0.1 to 1.0 μm. If the mean particle diameter is less than 0.1 μm, the resulting catalyst layer becomes dense, thereby the gas diffusion property thereof deteriorates and flooding is apt to occur. If the mean particle diameter is more than 1.0 μm, covering the electrode catalyst with the polymer electrolyte becomes difficult and the covered area is reduced, resulting in a decrease in performance of the catalyst layer.

The dispersion medium used to prepare the catalyst layer ink of the present invention may preferably be liquid containing alcohol capable of dissolving the polymer electrolyte or dispersing the polymer electrolyte (in which the polymer electrolyte may partially be dissolved).

The dispersion medium preferably contains at least one of water, methanol, propanol, n-butyl alcohol, isobutyl alcohol, sec-butyl alcohol and tert-butyl alcohol. They may be used solely or in combination of two or more of them. The alcohol preferably has a linear chain having a single OH group in its molecule. For example, ethanol is particularly preferable. Examples of the alcohol include those having ether linkage such as ethylene glycol monomethyl ether.

The catalyst layer ink preferably has a solid concentration of 0.1 to 1 to 20 weight %. If the solid concentration is less than 0.1 weight %, the catalyst layer ink needs to be applied or sprayed repeatedly to obtain intended thickness of the catalyst layer, resulting in poor production efficiency. Further, if the solid concentration is more than 20 weight %, viscosity of the catalyst layer ink increases and the resulting catalyst layer may possibly become uneven. More preferably, the solid concentration of the catalyst layer ink is 1 to 10 weight %.

In the present invention, it is preferable to prepare the catalyst layer ink such that the catalyst layer ink contains the electrode catalyst and the polymer electrolyte in the weight ratio of 50:50 to 85:15 on a solid content basis. Thereby, the polymer electrolyte covers the electrode catalyst with efficiency and the three-phase interface in the resulting membrane-electrode assembly increases in area. If the weight ratio of the electrode catalyst is less than 50, pores of the conductive carbon particles in which the electrode catalyst will be supported are blocked with the polymer electrolyte, reducing reaction site. Thereby, performance of the polymer electrolyte fuel cell may possibly deteriorate. On the other hand, if the weight ratio of the electrode catalyst is more than 85, the electrode catalyst may not be covered sufficiently with the polymer electrolyte, resulting in decrease in performance of the polymer electrolyte fuel cell. It is more preferable to adjust the weight ratio of the electrode catalyst and the polymer electrolyte to be 60:40 to 80:20.

Figure 3:
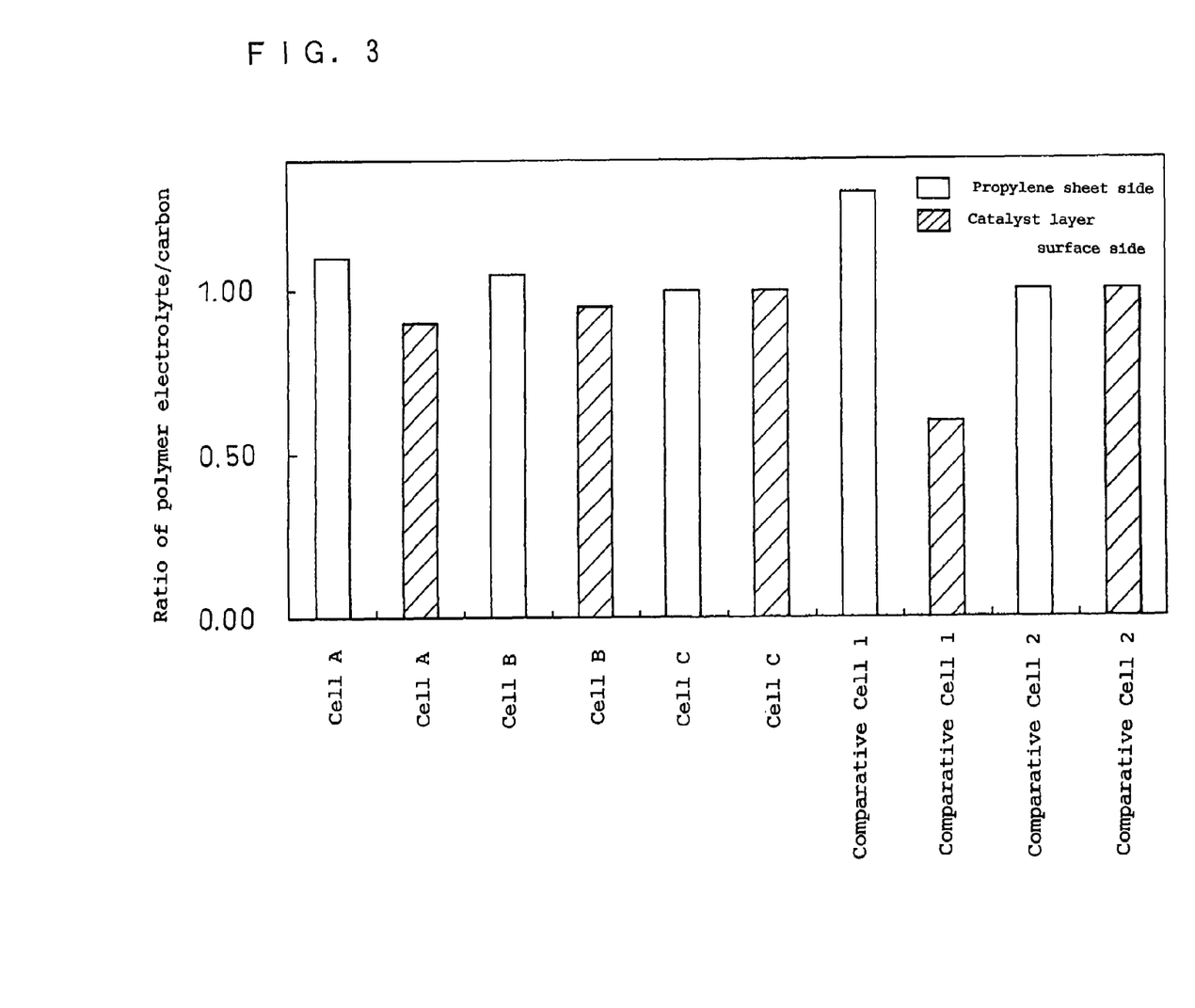
FIG. 3 is a graph illustrating distribution of a proton conductive polymer electrolyte in the thickness direction of a catalyst layer in fuel cells of Examples and Comparative Examples.

The catalyst layer ink of the present invention preferably has a Casson yield value in the range of 1.5 to 2.3 Pa. If the Casson yield value is in the range, the polymer electrolyte is less prone to distribute unevenly in the catalyst layer ink in the applying and drying process, and the catalyst layer ink is given with viscosity suitable for application. Use of this catalyst layer ink allows obtaining a catalyst layer in which the polymer electrolyte 23 is distributed evenly as illustrated in FIG. 3.

If the Casson yield value is less than 1.5 Pa, the application of the catalyst layer ink may be possible, but the polymer electrolyte tends to distribute unevenly in the drying process. Further, if the Casson yield value is more than 2.3 Pa, the application of the catalyst layer ink becomes very difficult.

The Casson yield value is a characteristic value of the catalyst layer ink measured and calculated by a cone-plate rotational viscometer referred to as an E-type viscometer. The Casson yield value is obtained by the Casson's equation (6) described below.

The Casson's equation (6) indicates that the values (7) and (8) are in a linear relationship. A straight line represented by the Casson's equation (6) is extended by extrapolation toward the axis of the value (7) to intersect at the point of (9). The square of the value (9) is the Casson yield value.

$$\sqrt{S} = \sqrt{\mu c \cdot D} = \sqrt{Sc} \quad (6)$$

[where S is shear stress (Pa), D is shear rate (1/s), μc is Casson viscosity (Pa·s) and Sc is Casson yield value (Pa)]

$$\sqrt{S} \quad (7)$$

$$\sqrt{D} \quad (8)$$

$$\sqrt{Sc} \quad (9)$$

The catalyst layer ink of the present invention may be prepared according to a technique known in the art except that the polymer electrolyte having the above-defined inertia radius is used. More specifically, the catalyst layer ink may be prepared by making use of high-speed rotation, for example, using a mixer such as a homogenizer or a homomixer, or a high-speed rotational jet flow system. Or alternatively, the catalyst layer ink may be prepared by a method of applying shear force to a dispersion by extruding the dispersion from a small outlet at high pressure using a high-pressure emulsifier.

Regarding the catalyst layer ink of the present invention as obtained in the above-described manner, it is preferred that when the ink is filtered through a membrane filter having pores of 0.2 μm in diameter, the polymer electrolyte is caught on the membrane filter by the capture ratio A (%) which simultaneously satisfies the following formulae (1) and (2):

$$50 \leq A \leq 90 \quad (1)$$

$$A = (1 - C/B) \times 100 \quad (2)$$

[in the formula (2) B represents the weight of the polymer electrolyte in the catalyst layer ink/(sum of the weight of the polymer electrolyte in the catalyst layer ink and the weight of the dispersion medium in the catalyst layer ink) and C represents the weight of the polymer electrolyte in a filtrate obtained through the filtration/the weight of the filtrate].

As described above, an adjustment is made such that when the catalyst layer ink of the present invention is filtered through the membrane filter having pores of 0.2 μm in diameter, the polymer electrolyte contained therein is caught on the membrane filter by the capture ratio A (%) that satisfies the formula (1), i.e., $50 \leq A \leq 90$. Thereby, it is allowed to confirm a posteriori that the polymer electrolyte contained in the catalyst layer ink at least has a preferred mean inertia radius (1) of 0.2 μm (200 nm). Accordingly, with use of the catalyst layer ink of the present invention satisfying the above requirements, a catalyst layer, which reduces the degree of the maldistribution of the polymer electrolyte to give excellent gas diffusion property, is obtained. Hence, a gas diffusion electrode, a membrane-electrode assembly and a polymer electrolyte fuel cell capable of maintaining high cell voltage for a long time are obtained.

Parameter B in the formula (2) represents a value of (the weight of the polymer electrolyte in the catalyst layer ink/(sum of the weight of the polymer electrolyte in the catalyst layer ink and the weight of the dispersion medium in the catalyst layer ink)). This value is determined from the composition ratio of the components of the catalyst layer ink.

Further, parameter C represents a value of (the weight of the polymer electrolyte in a filtrate obtained through the filtration/the weight of the filtrate). This value is obtained, for example, by drying the filtrate to remove the dispersion medium and measuring the weight of the remaining polymer electrolyte. The drying is carried out under the conditions determined by experiments, which allow the polymer electrolyte not to decompose and the dispersion medium to be sufficiently removed. The filtration is carried out under controlled conditions so as not to include the catalyst-supporting particles in the filtrate.

If the value A of the formula (1) is less than 50, the mean inertia radius (1) of the polymer electrolyte contained in the catalyst layer ink becomes too small, which leads to the maldistribution of the polymer electrolyte in the resulting catalyst layer and deteriorates the gas diffusion property of the catalyst layer. Further, if the value A is more than 90, the mean inertia radius of the polymer electrolyte becomes too large, thereby the polymer electrolyte cannot go into the pores of the conductive carbon particles, reducing the reaction area.

In order to obtain the value A by the formula (2), values B and C should be expressed in the same unit.

As to the catalyst layer ink of the present invention, it is preferred that when the ink is filtered through a membrane filter having pores of 1.0 μm in diameter and the resulting filtrate is diluted, the polymer electrolyte contained in the diluted filtrate has a mean inertia radius (2) of 150 to 300 nm.

As described above, the catalyst layer ink of the present invention is filtered through the membrane filter having pores of 1.0 μm in diameter and the resulting filtrate is diluted. Then, if the polymer electrolyte contained in the diluted filtrate has the mean inertia radius of 150 to 300 nm, it is allowed to confirm a posteriori that the polymer electrolyte contained in the catalyst layer ink has a preferred mean inertia radius. With use of the catalyst layer ink of the present invention that satisfies the above requirements, the degree of the maldistribution of the polymer electrolyte in the resulting catalyst layer is reduced and the catalyst layer is given with excellent gas diffusion property. Thereby, a gas diffusion electrode, a membrane-electrode assembly and a polymer electrolyte fuel cell capable of maintaining high cell voltage for a long time are obtained.

The filtrate obtained by filtering the catalyst layer ink through the membrane filter having pores of 1.0 μm in diameter is diluted such that the polymer electrolyte concentration becomes 0.1 to 1 wt %. Then, the diluted filtrate is subjected to static light scattering measurement to determine the intensity of scattered light from molecules of the polymer electrolyte in the diluted filtrate and angle dependence thereof. The inertia radius is obtained from the measurement results.

The catalyst layer ink can be formed on a base sheet using the catalyst layer ink of the present invention. More specifically, the catalyst layer ink is applied or sprayed onto the base sheet and the resulting liquid film is dried to form the catalyst layer.

The gas diffusion electrode of the present invention may comprise (I) a catalyst layer only, or (II) a combination of a gas diffusion layer and a catalyst layer formed thereon.

The gas diffusion electrode (I) may be a catalyst layer from which the base sheet has been peeled off, or a catalyst layer peelably formed on the base sheet. The base sheet may be a synthetic resin sheet which is insoluble in the catalyst layer ink, a laminate film comprising a stack of a synthetic resin sheet and a metal sheet, a metallic sheet, a ceramic sheet, a sheet of an inorganic-organic complex material or a polymer electrolyte membrane.

The gas diffusion electrode (II) may be a product comprising a gas diffusion layer, a catalyst layer, and one or more layers such as a water repellent layer sandwiched between the gas diffusion layer and the catalyst layer. Further, the product may include a gas diffusion layer, a catalyst layer, and a base sheet peelably adhered to the surface of the catalyst layer opposite to the gas diffusion layer.

Examples of the base sheet include (i) a polymer electrolyte membrane, (ii) a gas diffusion layer made of a porous material having gas diffusion property and electronic conductivity or (iii) any one of the followings: a synthetic resin sheet which is insoluble in the catalyst layer ink; a laminate film comprising a stack of a synthetic resin sheet and a metal sheet; a metallic sheet; a ceramic sheet; and a sheet of an inorganic-organic complex material.

Examples of the synthetic resin include, for example, polypropylene, polyethylene terephthalate, ethylene/tetrafluoroethylene copolymer and polytetrafluoroethylene.

The catalyst layer ink may be applied using an applicator, a bar coater, a die coater or a spray, or alternatively, by screen printing, gravure printing or the like.

In order to enhance the effect of the present invention, the two catalyst layers in the membrane-electrode assembly are preferably 3 to 50 μm in thickness, respectively. If the thickness is less than 3 μm, it is difficult to form the catalyst layers uniformly and durability thereof decreases due to lack of the catalyst amount. Further, if the thickness is more than 30 μm, gas supplied to the catalyst layers is not easily diffused, resulting in slow reaction. It is particularly preferred that the two catalyst layers in the membrane-electrode assembly are 5 to 20 μm in thickness, respectively.

The catalyst layer obtained by the above-mentioned production process is suitably used for manufacturing the gas diffusion electrode, the membrane-electrode assembly and the polymer electrolyte fuel cell.

If the base sheet is the polymer electrolyte membrane of (i), the catalyst layers are formed on both surfaces thereof to obtain the membrane-electrode assembly, and then the assembly is sandwiched between the gas diffusion layers made of carbon paper or carbon cloth, followed by hot press according to a known technique.

Further, if the base sheet is the gas diffusion layer of (ii), a polymer electrolyte membrane is sandwiched between the gas diffusion layers each provided with the catalyst layer such that the catalyst layers are in contact with the polymer electrolyte membrane, respectively, followed by hot press according to a known technique.

If the base sheet is selected from the sheets of (iii), the catalyst layer is formed on the base sheet, brought into contact with at least either of the polymer electrolyte membrane and the gas diffusion layer, and then transferred thereto by peeling the base sheet off. Then, they are pressed by a known technique.

Hereinafter, the present invention is described in further detail by way of examples, but the invention is not limited thereto.

EXAMPLES 1-3

(a) Preparation of Catalyst Layer Ink

Catalyst-supporting particles comprising conductive carbon particles (mean particle diameter: 0.1 to 1.0 μm, TEC10E50E manufactured by Tanaka Kikinzoku Kogyo K. K.) and platinum as an electrode catalyst in the weight ratio of 1:1 were dispersed in a dispersion of a proton conductive polymer electrolyte in ethanol such that the weight ratio of the polymer electrolyte and the conductive carbon particles became 1:1. Thus, ink for forming a cathodic catalyst layer was obtained.

The polymer electrolyte concentration in the polymer electrolyte dispersion was 10 weight %. The proton conductive polymer electrolyte used was perfluorocarbonsulfonic acid (EW1100) having a mean inertia radius (2) in 100% ethanol and a molecular weight shown in columns A to C of Table 1.

Ink for forming an anodic catalyst layer was prepared in the same manner as the preparation of the cathode catalyst layer ink described above except that conductive carbon particles (mean particle diameter: 0.1 to 1.0 μm, TEC61E54E manufactured by Tanaka Kikinzoku Kogyo K. K.) supporting thereon a platinum/ruthenium alloy in place of platinum were used as the electrode catalyst.

The cathode catalyst layer ink and the anode catalyst layer ink used for the same fuel cell had the same mean inertia radius.

TABLE 1

|  | A Cell A | B Cell B | C Cell C | D Comparative cell 1 | E Comparative cell 2 |
|---|---|---|---|---|---|
| Mean inertia radius (2) of polymer electrolyte (nm) | 150 | 225 | 300 | 75 | 375 |
| Molecular weight of polymer electrolyte | 200,000 | 300,000 | 400,000 | 100,000 | 500,000 |
| Casson yield value of catalyst layer ink (Pa) | 1.5 | 2.0 | 2.3 | 1.0 | 2.4 |
| Value A of formula (1) (%) | 50 | 60 | 90 | 10 | 95 |

As to the catalyst layer inks each containing perfluorocarbonsulfonic acid having different mean inertia radius, Casson yield values were measured. The rotational viscometer used was provided with a corn-plate having a diameter of 35 mm and a corn angle of 2°. Shear rate was measured in the range of 0.1 to 100 S$^{-1}$ and temperature for the measurement was 25° C. Each of the catalyst layer inks contained 16.6 weight % of the catalyst-supporting particles, 8.3 weight % of the polymer electrolyte and 75.1 weight % of ethanol.

Casson yield values of the catalyst layer inks calculated by the above-described Casson's equation are shown in Table 1.

Then, each of the thus prepared catalyst layer inks was filtered through a membrane filter having pores of 0.2 μm in diameter, a cellulose-mixed type membrane filter manufactured by Advantec Toyo Kaisya, Ltd. The capture ratio A (%) of the polymer electrolyte caught on the membrane filter was obtained by the following formula (2).

$$A=(1-C/B)\times 100 \qquad (2)$$

Value B in the above formula, which represents {the weight of the polymer electrolyte in the catalyst layer ink/(sum of the weight of the polymer electrolyte in the catalyst layer ink and the weight of the dispersion medium in the catalyst layer ink)}, was obtained by measuring the weight of the polymer electrolyte and the weight of the dispersion medium contained in the catalyst layer ink prior to the filtration. Further, value C, which represents (the weight of the polymer electrolyte in a filtrate obtained through the filtration/the weight of the filtrate), was obtained by measuring the weight of the filtrate and the weight of the polymer electrolyte in the filtrate.

Further, each of the catalyst layer inks was filtered through a membrane filter having pores of 1.0 μm in diameter, a cellulose-mixed type membrane filter manufactured by Advantec Toyo Kaisya, Ltd., to obtain a filtrate. The filtrate was then diluted with ethanol to have a polymer electrolyte concentration of 0.1 to 1.0 wt %, and the mean inertia radius thereof was obtained in the above-described manner. The obtained mean inertia radius was the same as that measured in the polymer electrolyte dispersion used to prepare the catalyst layer ink.

(b) Manufacture of Gas Diffusion Electrode and Membrane-Electrode Assembly (MEA)

Using a bar coater, a cathode catalyst layer ink was applied to a base sheet (a 50 μm thick polypropylene sheet) such that the platinum weight was 0.35 mg/cm$^2$, which was dried at room temperature to obtain a cathode catalyst layer on the base sheet.

The base sheet provided with the cathode catalyst layer was cut into a predetermined size (60 mm square) using a cutting die. After cutting, the catalyst layer on the base sheet was heat-transferred to one surface of a proton conductive polymer electrolyte membrane (a Goreselect membrane manufactured by Gore) at 130% and 50 kg/cm$^2$.

In the same manner, using a bar coater, an anode catalyst layer ink was applied to a base sheet (a 50 μm thick polypropylene sheet) such that the platinum weight was 0.35 mg/cm$^2$, which was dried at room temperature to obtain an anode catalyst layer on the base sheet.

The base sheet provided with the anode catalyst layer was cut into a predetermined size (60 mm square) using a cutting die. After cutting, the catalyst layer on the base sheet was heat-transferred to the other surface of the above proton conductive polymer electrolyte membrane at 130% and 50 kg/cm$^2$.

Then, carbon cloth of 400 μm thick (GF-20-31E manufactured by Nippon Carbon Co., Ltd.) was impregnated with an aqueous dispersion containing a fluororesin (Neoflone ND1 manufactured by Daikin Industries), which was dried at room temperature to give water repellency.

Subsequently, an aqueous dispersion containing a fluororesin (Polyflone D1 manufactured by Daikin Industries) was added to a mixed solution obtained by dispersing conductive carbon particles in a dispersion containing distilled water and a surfactant Triton X-100. The resulting mixture was stirred in a planetary mixer to prepare ink for forming a water repellent layer. The thus obtained water repellent layer ink contained 73 weight % of distilled water, 2 weight % of Triton X-100, 21 weight % of conductive carbon particles and 4 weight % of Polyflone D1.

To one of the surfaces of the water repellent carbon cloth, the water repellent layer ink was applied such that the solid ink weight therein became 4 mg/cm$^2$, and then dried at room temperature. After drying, the ink was baked at 380% for 10 minutes to form a water repellent layer.

The carbon cloth provided with the water repellent layer was cut into a predetermined size (60 mm square) using a cutting die to be used as a gas diffusion layer. The thus cut gas diffusion layer was arranged on each of the catalyst layers sandwiching the proton conductive polymer electrolyte membrane such that the water repellent layer was in contact with the catalyst layers, respectively.

Then, a composite gasket comprising three layers of silicone rubber/polyethylene terephthalate/silicone rubber was arranged on the periphery of the gas diffusion electrode comprising the catalyst layer and the gas diffusion layer.

Then, the polymer electrolyte membrane, two catalyst layers, two gas diffusion layers and the gasket were pressed under heating at 130° C. and 50 kgf/cm$^2$ for 10 minutes to obtain a membrane-electrode assembly (MEA). Unit cells, each of which was manufactured with the MEA containing perfluorocarbonsulfonic acid having different mean inertia radius, are referred to as fuel cells A, B and C.

COMPARATIVE EXAMPLES 1 AND 2

MEAs and comparative cell 1 and 2 were formed in the same manner as Example 1 except that the molecular weight and the mean inertia radius of the proton conductive polymer electrolyte was varied as shown in columns D and E of Table 1.

[Evaluations]

The thus manufactured cells A to C and comparative cells 1 and 2 were evaluated in the following manner.

(1) Measurement of Polymer Electrolyte Distribution in the Catalyst Layer Along the Thickness Direction As to the cells of Examples and Comparative Examples, distribution of the polymer electrolyte in the catalyst layer formed on the base sheet (polypropylene sheet) along the thickness direction was analyzed using an electron probe microanalyzer (EPMA).

Based on the analysis results, calculation was carried out to obtain the weight ratio of the polymer electrolyte (perfluorocarbonsulfonic acid) with respect to the conductive carbon particles (polymer electrolyte/conductive carbon particles) on the base sheet side and the top side of the catalyst layer. The results are shown in a graph of FIG. 3. FIG. 3 is a graph illustrating distribution of a proton conductive polymer electrolyte in the thickness direction of a catalyst layer in fuel cells of Examples and Comparative Examples.

The larger the mean inertia radius of the polymer electrolyte was, and the larger the Casson yield value of the catalyst layer ink was, the more evenly the polymer electrolyte distributed in the thickness direction of the catalyst layer. In other words, the ratio of polymer electrolyte/conductive carbon particles approached 1.0.

It is considered that increasing the mean inertia radius of the polymer electrolyte prevented the catalyst layer ink from flowing on the base sheet.

(2) Initial Cell Characteristic

As to the cells A to C and comparative cells 1 and 2, initial I-V characteristic was measured at a fuel cell temperature of 70° C. At that time, hydrogen (H$_2$) humidified to have a dew point of 70 was supplied to the anode at atmospheric pressure, while air humidified to have a dew point of 70° C. was supplied to the cathode at atmospheric pressure. Hydrogen utilization ratio was 70% and oxygen utilization ratio was 50%. The results are shown in FIG. 4.

Figure 4:
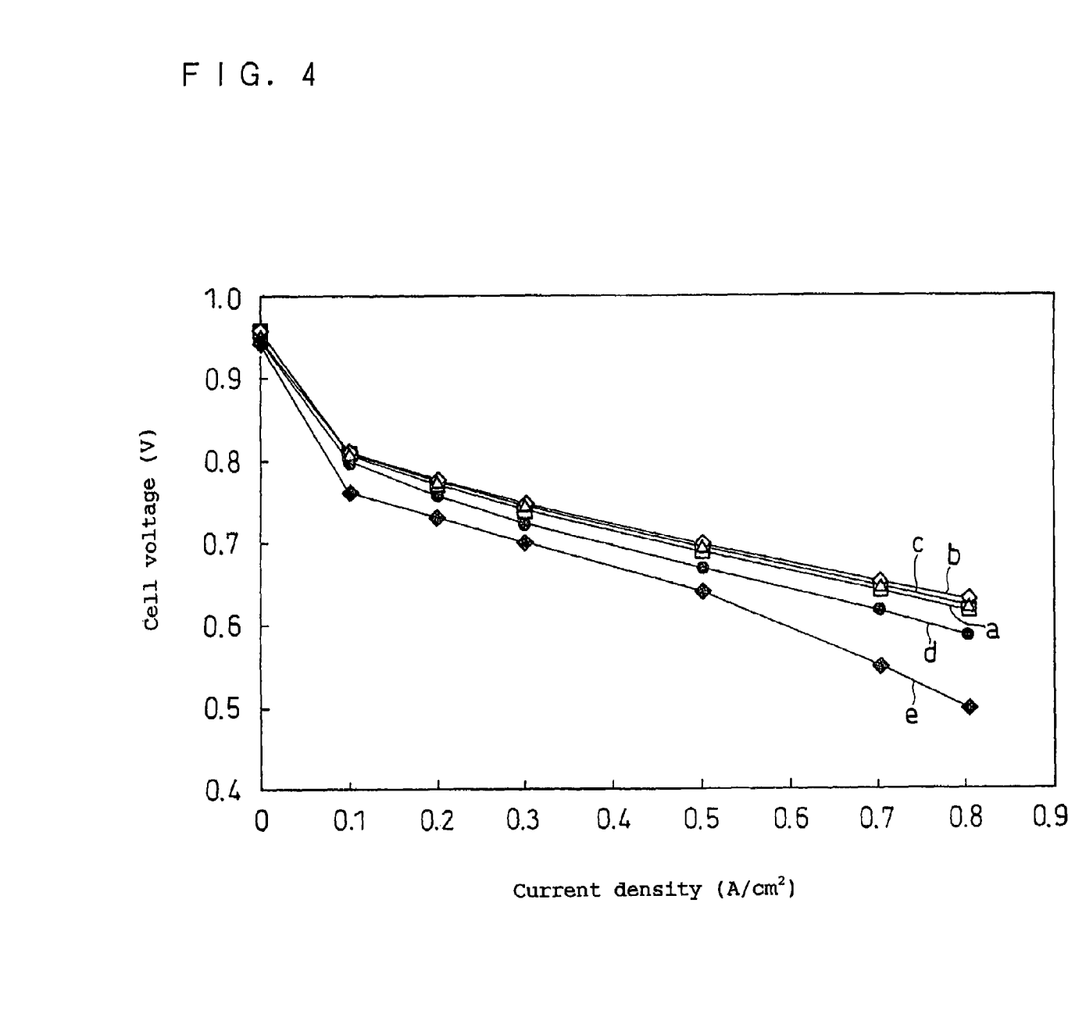
FIG. 4 is a graph illustrating initial I-V characteristics of the polymer electrolyte fuel cells of Examples and Comparative Examples where $H_2$ and air are supplied.

FIG. 4 is a graph illustrating initial I-V characteristics of the polymer electrolyte fuel cells of Examples and Comparative Examples where H$_2$ and air are supplied. In FIG. 4, plots a, b, c, d and e correspond to cells A, B, C, comparative cells 1 and 2, respectively (the same applies to FIGS. 5 to 7).

FIG. 4 indicates that the cells A to C show higher cell voltage than the comparative cells 1 and 2. In particular, the difference between voltages of the cells A to C and voltages of the comparative cells 1 and 2 is greater in a high current density range. Therefore, it is considered that the maldistribution of the polymer electrolyte in the thickness direction of the catalyst layer was alleviated to improve the gas diffusion property of the cathode.

In the comparative cell 2, the mean inertia radius of the proton conductive polymer electrolyte was too large. Therefore, the polymer electrolyte was not able to get into the pores of the conductive carbon particles, reducing the reaction area in the catalyst layer. Thereby, the cell voltage was lowered in the entire current density range.

Figure 5:
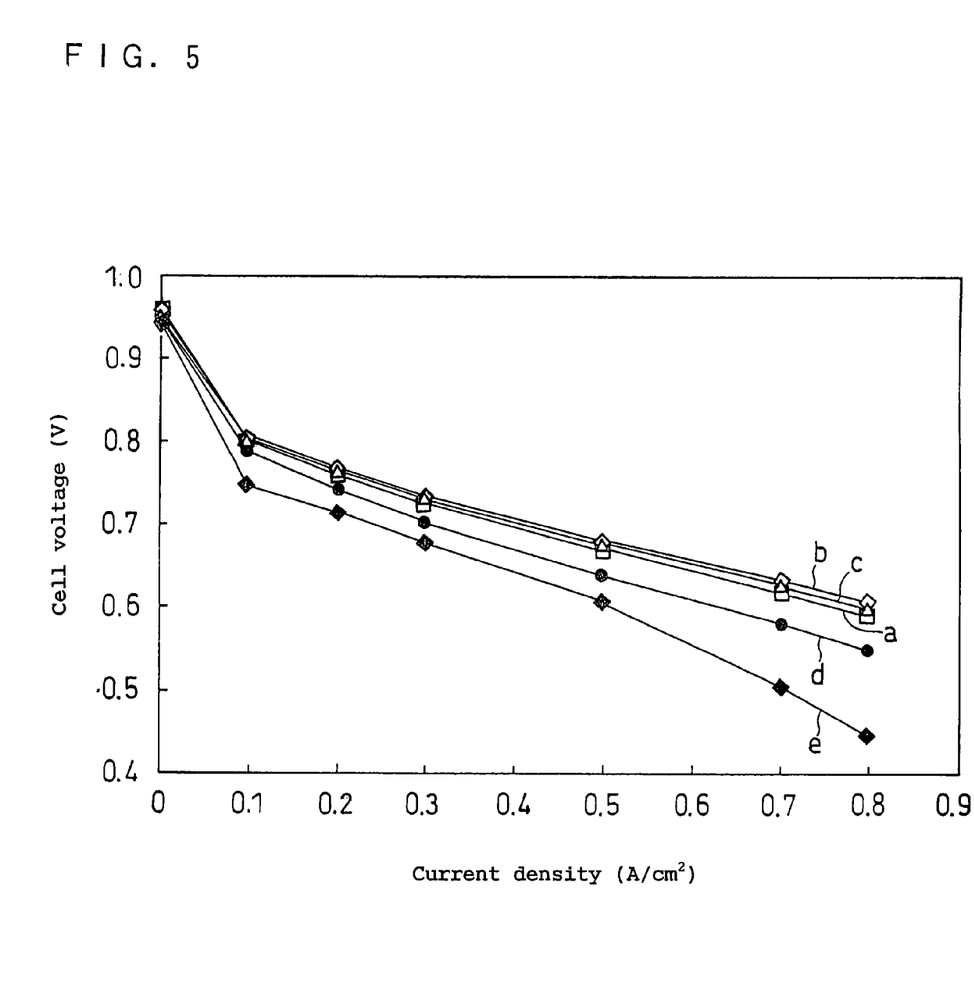
FIG. 5 is a graph illustrating initial I-V characteristics of the polymer electrolyte fuel cells of Examples and Comparative Examples where SRG and air are supplied.

Then, initial I-V characteristics of the cells A to C and the comparative cells 1 and 2 were measured at a fuel cell temperature of 70° C. in the same manner as the above except that H$_2$ was replaced with a simulated reformed gas (SRG, H$_2$: 70%, CO$_2$: 20%, CO: 20 ppm). SRG was humidified to have a dew point of 70° C. and supplied to the anode at atmospheric pressure, while air humidified to have a dew point of 70° C. was supplied to the cathode at atmospheric pressure. The hydrogen utilization ratio was 70% and the oxygen utilization ratio was 50%. FIG. 5 shows the results. FIG. 5 is a graph illustrating initial I-V characteristics of the polymer electrolyte fuel cells of Examples and Comparative Examples where SRG and air are supplied.

Figure 6:
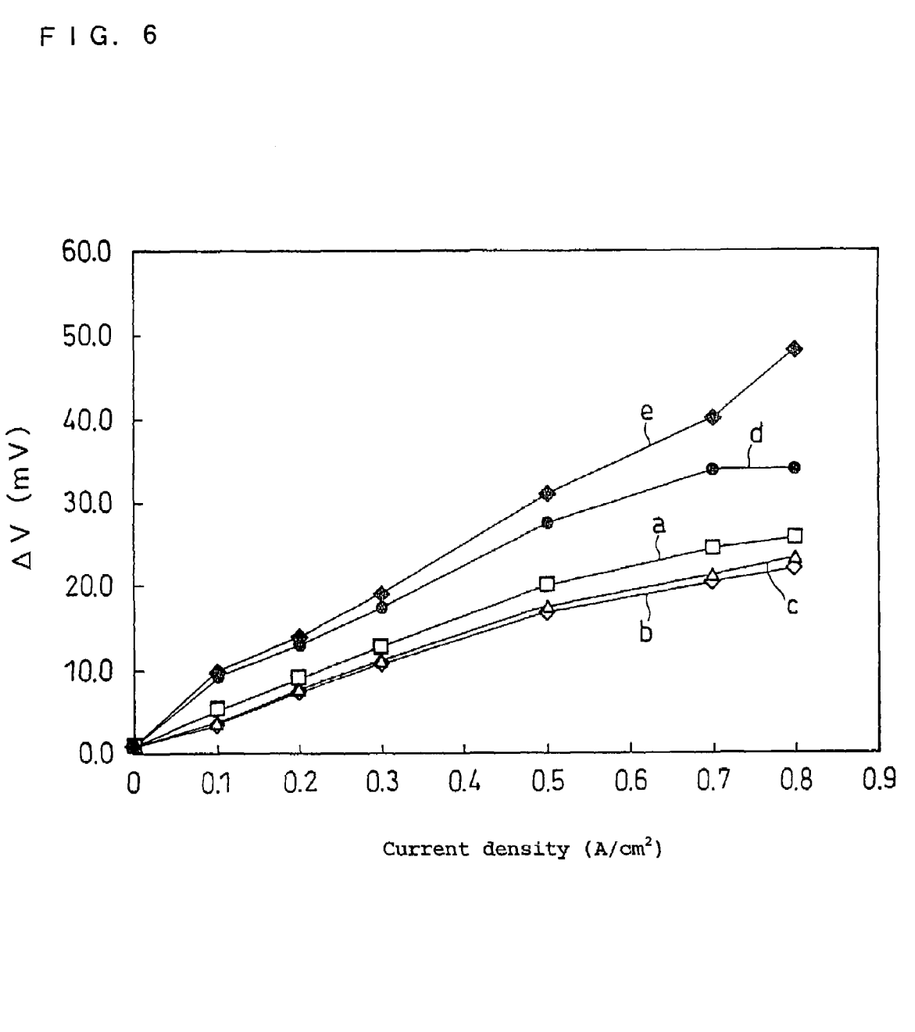
FIG. 6 is a graph illustrating difference ΔV between voltage generated when $H_2$ is used and voltage generated when SRG is used in the polymer electrolyte fuel cells of Examples and Comparative Examples.

Further, FIG. 6 shows the difference ΔV between voltage generated when H₂ was used and voltage generated when SRG was used in the cells A to C and the comparative cells 1 and 2. FIG. 6 is a graph illustrating difference ΔV between voltage generated when H₂ is used and voltage generated when SRG is used in the polymer electrolyte fuel cells of Examples and Comparative Examples.

FIG. 5 indicates that the cells A to C showed higher cell voltage than the comparative cells 1 and 2. It is considered that the degree of the maldistribution of the polymer electrolyte in the thickness direction of the catalyst layer was reduced and the gas diffusion property of the cathode was improved as in the case where hydrogen was used as the fuel gas.

Further, FIG. 6 shows that a decrease in voltage by use of SRG was small in the cells A to C. This indicates that the gas diffusion property and resistance to CO poisoning were improved also in the anode.

(3) Durability of Cell

Figure 7:
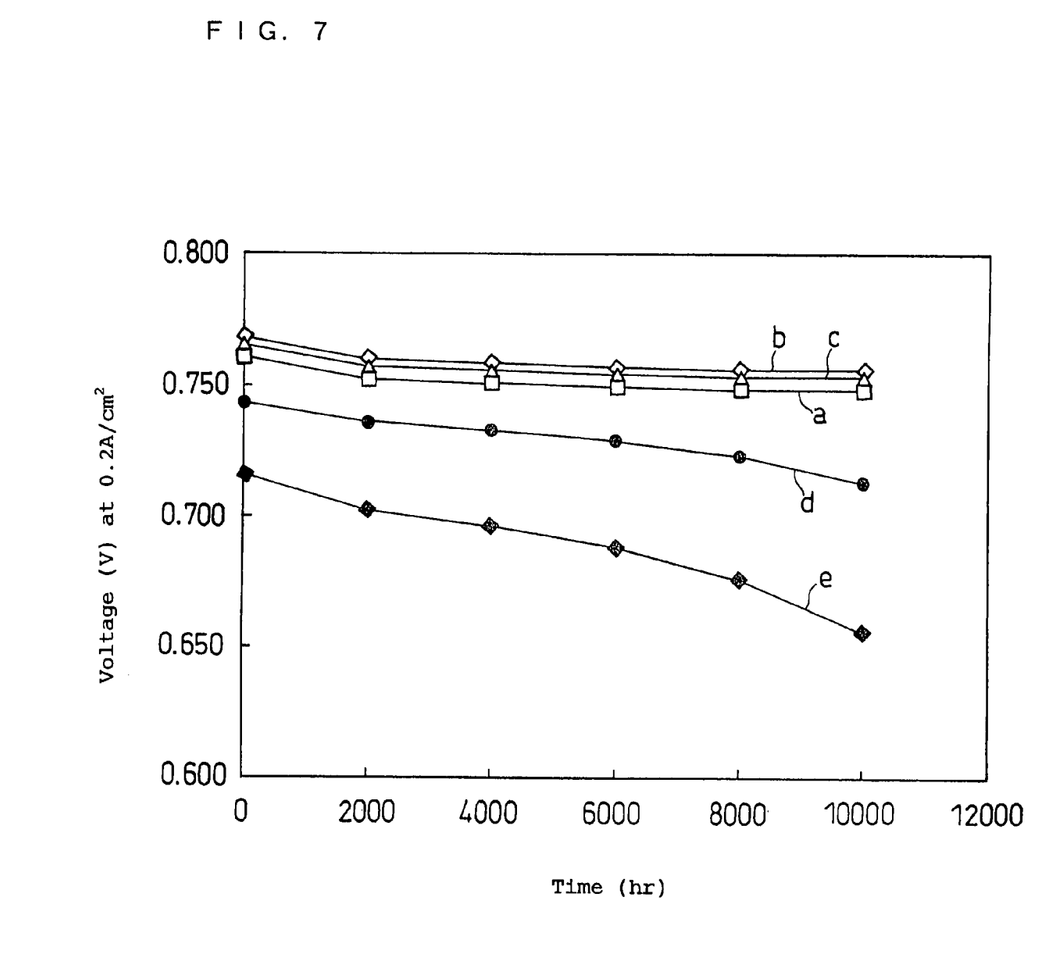
FIG. 7 is a graph illustrating voltage variation with time at a constant current density (0.2 $A/cm^2$) in the polymer electrolyte fuel cells of Examples and Comparative Examples.

The cells of Examples and Comparative Examples were subjected to a durability test under a current density of 0.2 A/cm². At that time, a simulated reformed gas (SRG, H₂: 70%, CO₂: 20%, CO: 20 ppm) humidified to have a dew point of 70° C. was supplied to the anode at atmospheric pressure, while air humidified to have a dew point of 70° C. was supplied to the cathode at atmospheric pressure. Hydrogen utilization ratio was 70% and oxygen utilization ratio was 50%. FIG. 7 shows the results. FIG. 7 is a graph illustrating voltage variation with time at a constant current density (0.2 A/cm²) in the polymer electrolyte fuel cells of Examples and Comparative Examples FIG. 7 indicates that the decreasing rate of the voltages of the comparative cells 1 and 2 increased with time, whereas the cells A to C maintained high voltages from the initial state for a long time. This indicates that the fuel cell using the catalyst layer of the present invention is able to maintain a stable voltage for a long time.

With use of the catalyst layer ink of the present invention, a polymer electrolyte fuel cell capable of maintaining high and stable voltage for a long time is provided. This fuel cell can suitably be adopted for motor vehicles and domestic cogeneration systems.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. Ink for forming a catalyst layer comprising at least: a cation conductive polymer electrolyte; catalyst-supporting particles comprising conductive carbon particles and an electrode catalyst supported thereon; and a dispersion medium, wherein said polymer electrolyte has a mean inertia radius of 150 to 300 nm.

2. The ink in accordance with claim 1, wherein Casson yield value of the ink is 1.5 to 2.3 Pa.

3. The ink in accordance with claim 1, wherein said catalyst-supporting particles have a mean particle diameter of 0.1 to 1.0 μm.

4. The ink in accordance with any one of claims 1 to 3, wherein when said ink is filtered through a membrane filter having pores of 0.2 μm in diameter, said polymer electrolyte is caught on the membrane filter by the capture ratio A (%) which simultaneously satisfies the following formulae (1) and (2):

$$50 \leq A \leq 90 \quad (1)$$

$$A = (1 - C/B) \times 100 \quad (2)$$

[in the formula (2) B represents (the weight of said polymer electrolyte/(sum of the weight of said polymer electrolyte and the weight of said dispersion medium)) and C represents (the weight of said polymer electrolyte/the weight of a filtrate obtained through the filtration)].

5. The ink in accordance with any one of claims 1 to 3, wherein when said ink is filtered through a membrane filter having pores of 1.0 μm in diameter and the resulting filtrate is diluted, said polymer electrolyte contained in the diluted filtrate has a mean inertia radius of 150 to 300 nm.

6. The ink in accordance with any one of claims 1 to 3, wherein said dispersion medium contains at least one constituent selected from the group consisting of water, methanol, propanol, n-butyl alcohol, isobutyl alcohol, sec-butyl alcohol and tert-butyl alcohol.

7. A gas diffusion electrode comprising a catalyst layer made of the ink in accordance with claim 1, wherein said electrode comprises at least: a cation conductive polymer electrolyte; catalyst-supporting particles comprising conductive carbon particles and an electrode catalyst supported thereon; and a dispersion medium.

8. A membrane-electrode assembly comprising: a first electrode having a first catalyst layer; a second electrode having a second catalyst layer; and a polymer electrolyte membrane arranged between said first electrode and said second electrode, wherein at least one of said first catalyst layer and said second catalyst layer is made of the ink in accordance with claim 1 comprising at least: a cation conductive polymer electrolyte; catalyst-supporting particles comprising conductive carbon particles and an electrode catalyst supported thereon; and a dispersion medium.

9. A polymer electrolyte fuel cell comprising: the membrane-electrode assembly in accordance with claim 8; and a pair of conductive separator plates each having a gas flow channel for supplying reaction gas to said membrane-electrode assembly.

* * * * *